US009790902B2

(12) United States Patent
Dopke et al.

(10) Patent No.: US 9,790,902 B2
(45) Date of Patent: Oct. 17, 2017

(54) ENGINE CYLINDER HEAD INTAKE PORT CONFIGURATION

(71) Applicant: Champion Engine Technology, LLC, Sussex, WI (US)

(72) Inventors: Russell J. Dopke, Elkhart Lake, WI (US); James J. Dehn, Brookfield, WI (US)

(73) Assignee: Champion Engine Technology, LLC, Sussex, WI (US)

( * ) Notice: Subject to any disclaimer, the term of this patent is extended or adjusted under 35 U.S.C. 154(b) by 497 days.

(21) Appl. No.: 14/270,909

(22) Filed: May 6, 2014

(65) Prior Publication Data
US 2015/0322883 A1 Nov. 12, 2015

(51) Int. Cl.
*F02F 1/42* (2006.01)
*F02M 35/10* (2006.01)
*F02F 1/24* (2006.01)
*F02B 63/02* (2006.01)
*F02B 63/04* (2006.01)

(52) U.S. Cl.
CPC ......... *F02M 35/1017* (2013.01); *F02B 63/02* (2013.01); *F02B 63/048* (2013.01); *F02F 1/24* (2013.01); *F02F 1/4235* (2013.01); *F02M 35/10124* (2013.01); *F02M 35/10262* (2013.01); *F02M 35/10281* (2013.01); *F02M 35/10288* (2013.01); *Y02T 10/146* (2013.01)

(58) Field of Classification Search
CPC .............. F02F 1/24; F02F 1/42; F02F 1/4235
USPC ...................................................... 123/193.5
See application file for complete search history.

(56) References Cited

U.S. PATENT DOCUMENTS

| 4,159,011 | A | 6/1979 | Sperry |
| 4,905,636 | A | 3/1990 | Kronich |
| 5,404,856 | A | 4/1995 | Servati |
| 5,598,820 | A | 2/1997 | Sokoloski |
| 7,182,057 | B2 | 2/2007 | Sato |
| 7,938,099 | B2 | 5/2011 | Abe et al. |
| 8,402,937 | B2 | 3/2013 | Mamy et al. |

(Continued)

FOREIGN PATENT DOCUMENTS

FR           2924165 A3 *  5/2009  ............... B22C 9/10

*Primary Examiner* — Lindsay Low
*Assistant Examiner* — Omar Morales
(74) *Attorney, Agent, or Firm* — Ziolkowski Patent Solutions Group, SC

(57) ABSTRACT

A cylinder head for an internal combustion engine is disclosed having an intake port geometry configured to reduce fuel puddling and improve fuel atomization. The cylinder head includes a housing having a recess defining a top portion of a combustion chamber. The cylinder head further includes intake and exhaust ports defined by channels extending from the top portion of the combustion chamber to an outer end of the housing. An intake valve is positioned within the cylinder head to control communication of the intake port with the combustion chamber, and an exhaust valve is positioned within the cylinder head to control communication of the exhaust port with the combustion chamber. The intake port further includes a cross-section having a modified D-shape with a single 90 degree corner. The modified D-shape cross-section extends substantially a length of the intake port.

29 Claims, 10 Drawing Sheets

(56) References Cited

U.S. PATENT DOCUMENTS

2003/0168040 A1 9/2003 Takamiya et al.
2013/0014721 A1* 1/2013 Trease ....................... 123/193.5

* cited by examiner

ENGINE CYLINDER HEAD INTAKE PORT CONFIGURATION

BACKGROUND OF THE INVENTION

Embodiments of the invention relate generally to cylinder head intake port configuration for internal combustion engines and, more particularly, to intake port geometry configured to reduce fuel puddling and improve fuel atomization.

Puddling of fuel in an intake passage of an internal combustion engine leads to several undesirable conditions. Fuel puddling occurs when an engine is shut down or is run at very low speeds. In these conditions, the air stream within the intake manifold lacks sufficient velocity and turbulences to keep fuel in suspension. As a result, liquid fuel tends to settle out and collect in low areas of the intake.

When running at low speeds, liquid fuel present in the intake port may drain into the combustion chamber through the intake valve. When air stream velocity in the intake manifold increases due to acceleration, the fuel puddles are drawn into the combustion chamber and results in excess fuel present during combustion, which leads to incomplete combustion resulting in a surge of black smoke in the exhaust or backfiring through the carburetor. When fuel puddles in the intake after shut down, upon start up, the result is an overly rich air/fuel mixture that can result in misfires and audible pops.

The combustion process could be improved if the air/fuel mixture was more consistent upon start up and acceleration. A more consistent mixture will result if the evaporation rate within the intake port is increased because less liquid fuel will be present. The increased atomization will result in improved combustion and more consistent exhaust emissions.

Some engines may have modified intake port geometry to reduce fuel puddling and improve atomization. For instance, the intake port may provide for liquid fuel to drain into a high turbulent region created by a ridge or a bump. The turbulence will increase atomization of the liquid fuel and improve the air/fuel mixture. However, engines are often desired to operate in more than one orientation. Accordingly, liquid fuel may not properly drain into the turbulent region when the engine operates in a second orientation.

Therefore, it would be desirable to design a cylinder head for an internal combustion engine with an intake port to reduce fuel puddling. Also, it would be desirable to have an intake port geometry that would improve fuel atomization. It would be further advantageous if an engine could reduce fuel puddling and improve atomization when the engine is configurable for operation in different orientations.

BRIEF DESCRIPTION OF THE INVENTION

The invention relates generally to a cylinder head intake port geometry for an internal combustion engine configured to reduce fuel puddling and improve fuel atomization.

In accordance with one aspect of the invention, a cylinder head for an internal combustion engine includes a housing having a recess defining a top portion of a combustion chamber. The cylinder head further includes an intake port defined by a first channel extending from the top portion of the combustion chamber to an outer end of the housing, and an exhaust port defined by a second channel extending from the top portion of the combustion chamber to an outer end of the housing. An intake valve is positioned within the cylinder head to control communication of the intake port with the combustion chamber, and an exhaust valve is positioned within the cylinder head to control communication of the exhaust port with the combustion chamber. The intake port further includes a cross-section having a modified D-shape with a single 90 degree corner. The modified D-shape cross-section extends substantially a length of the intake port.

In accordance with another aspect of the invention, an internal combustion engine is configured to operate in a horizontal and a vertical crankshaft configuration. The engine includes a cylinder block having at least one cavity defining a combustion chamber, a crankshaft rotatably mounted to cylinder block, and at least one piston moveably inserted in the cylinder block cavity. At least one cylinder head is mounted to the cylinder block to enclose the combustion chamber. The cylinder head includes an intake port defined by a first passage in communication with the combustion chamber, the intake port having first and second flat planar surfaces and an exhaust port defined by a second passage in communication with the combustion chamber. An intake valve is positioned to control communication of the intake port with the combustion chamber and an exhaust valve is positioned to control communication of the exhaust port with the combustion chamber. The first flat surface of the intake port has a cross-section that is substantially horizontal when the engine is positioned in a first orientation where the crankshaft is substantially horizontally oriented, while the second flat surface of the intake port has a cross-section that is substantially horizontal when the engine is positioned in a second orientation, different from the first orientation, and where the crankshaft is substantially vertically oriented.

In accordance with a further aspect of the invention, an engine operable in a first orientation and a second orientation includes a cylinder block coupled to a crankcase and a cylinder head coupled to the cylinder block. The cylinder head includes an intake port and an exhaust port. The intake port has a first substantially flat surface and a second substantially flat surface. The intake port further includes a cross-section having an arch surface coupled at each end by a pair of substantially parallel planar surfaces. The first substantially parallel planar surface has a length longer than the second substantially parallel planar surface. The second substantially parallel planar surface is coupled at an end opposite the arch surface to a chamfer surface at approximately a 45 degree angle. An opposite side of the chamfered surface is connected to the first substantially parallel planar surface by a planar longitudinal surface that is opposite the arch surface.

In accordance with yet a further aspect of the invention, an engine includes a cylinder coupled to a crankcase and a cylinder head coupled to the cylinder. The cylinder has a central axis. The cylinder head includes an intake port and an exhaust port. The intake port includes a first planar surface that is relatively horizontal with respect to a horizon, and a second surface adjacent to the first planar surface. The second surface has a cross section perpendicular to the central axis. The intake port further includes a third planar surface adjacent the second surface and opposite the first planar surface.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Embodiments of the invention are directed to an intake port of a cylinder head of an air cooled internal combustion engine; a push rod tube configuration within the cylinder head of the air cooled combustion engine; and an air guide for directing cooling air to the cylinder head of the air cooled combustion engine. The various embodiments of the invention are incorporated into the air cooled internal combustion engine, which in turn is incorporated as a prime mover/prime power source in any of a number of various applications, including but not limited to, power generators, lawnmowers, power washers, recreational vehicles, and boats, as just some examples. While embodiments of the invention are described below, it is to be understood that such disclosure is not meant to be limiting but set forth examples of implementation of the inventions. The scope of the inventions is meant to encompass various embodiments and any suitable application in which a general purpose internal combustion engine can benefit from the inventions shown and described herein. It is understood that certain aspects of the inventions may equally be applicable to non-air cooled internal combustion engines as well and such is within the scope of the present inventions.

Figure 1:
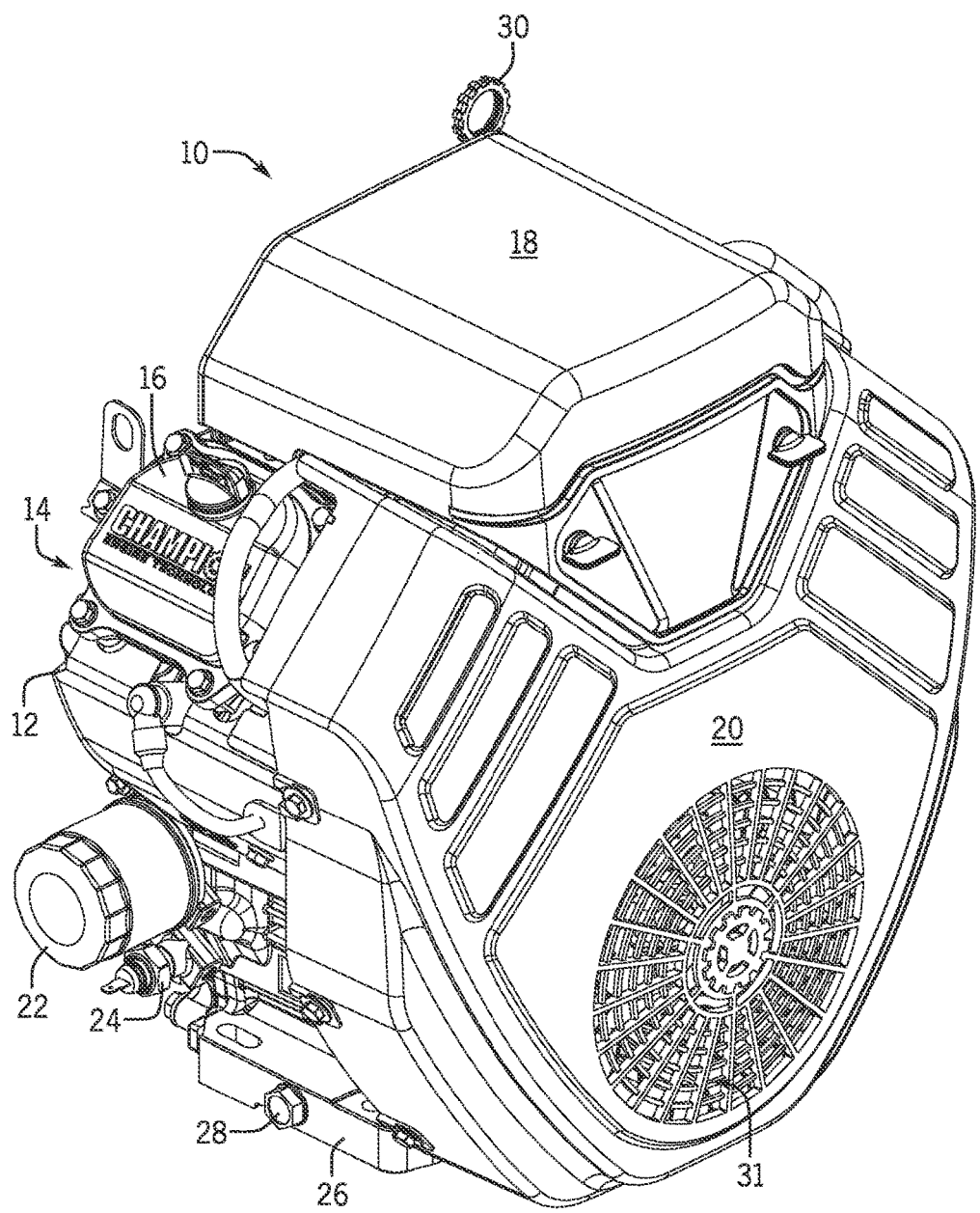
FIG. 1 is a perspective view of an internal combustion engine incorporating the present invention.

Referring first to FIG. 1, an internal combustion engine 10 is an exemplary V-twin having two combustion chambers and associated pistons (not shown) within an engine block 12 having a pair of cylinder heads 14 capped by rocker covers 16. The internal combustion engine 10 of FIG. 1 includes decorative and functional covers 18 and 20, as well as conventional oil filter 22, pressure sensor 24, oil pan 26, drain plug 28, and dip stick 30, together with the other conventional parts associated with an internal combustion engine. A cooling source 31 draws cooling air in toward internal combustion engine 10 through covers 20.

Figure 2:
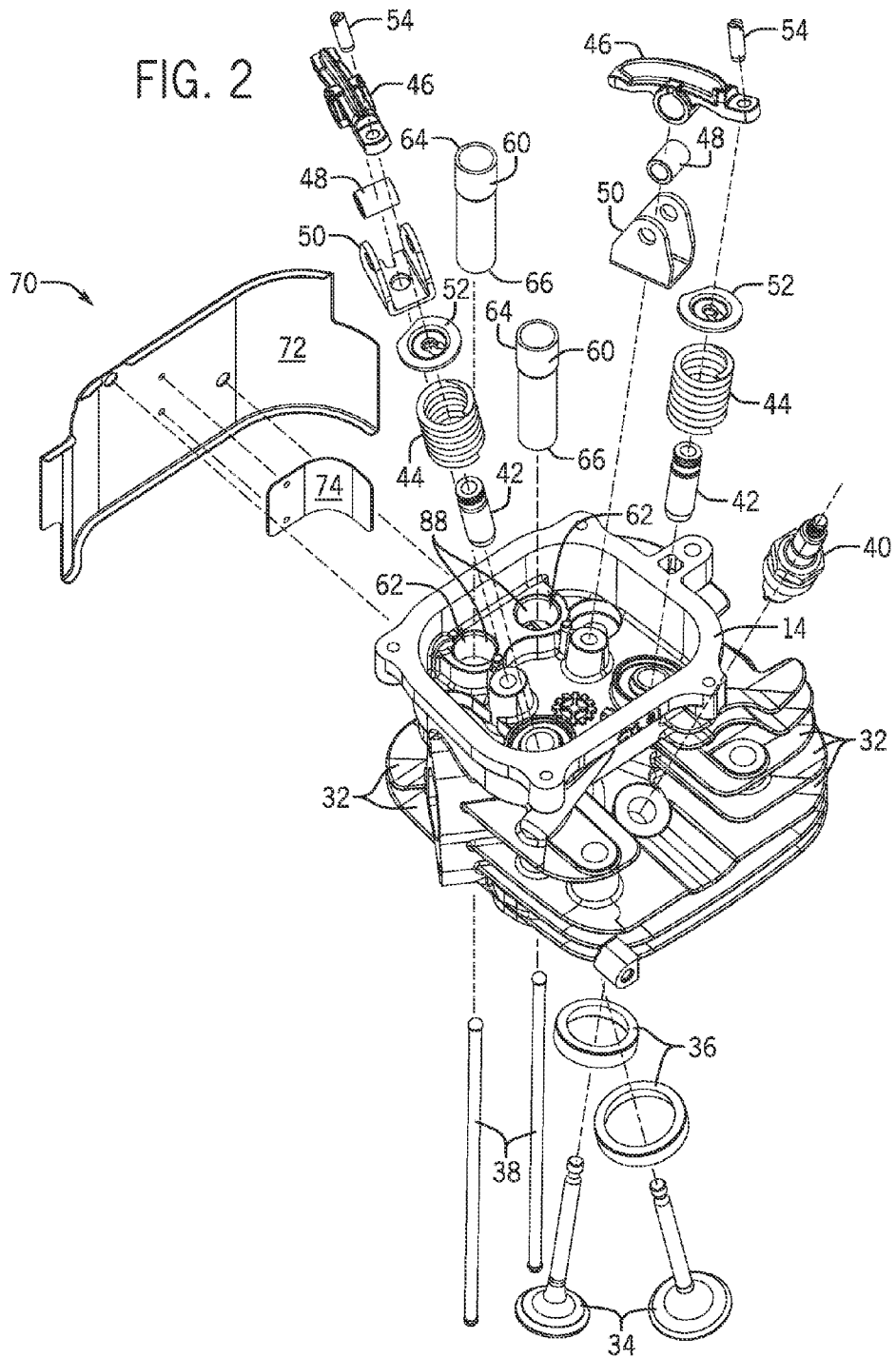
FIG. 2 is an exploded perspective view of a cylinder head of FIG. 1 incorporating the present invention.

FIG. 2 is an exploded view of cylinder head 14 having a plurality of cooling fins 32, intake and exhaust valves 34, valve seats 36, and push rods 38. Exploded from the upper portion of cylinder head 14 are spark plug 40, valve guides 42, valve springs 44, rocker arms 46, bushings 48, rocker arm supports 50, spring caps 52, and slack adjusters 54. All operational in a conventional manner.

Cylinder head 14 includes push rod tubes 60 that are pressed fit into respective bores 62 of cylinder head 14. Each push rod tube 60 has two outside diameters 64, 66 that are received into bore 62 of cylinder head 14 such that the smaller diameter 66 passes unobstructed through the bore 62 until the larger diameter 64 reaches the top of bore 62 to allow an even press-in fit. As is shown in further detail and will be described hereinafter with respect to FIGS. 9 and 10.

FIG. 2 also shows an air guide/diverter 70 having a main diverter shield 72 and a secondary air guide/diverter 74 attached thereto by fastening with anchors or welding. It is understood that the air guide/diverter 70 could be constructed as a single unitary structure or a multi-piece configuration having two or more pieces. The structure and function of the air diverter 70 will be further described with reference to FIGS. 11-14.

Figure 3:
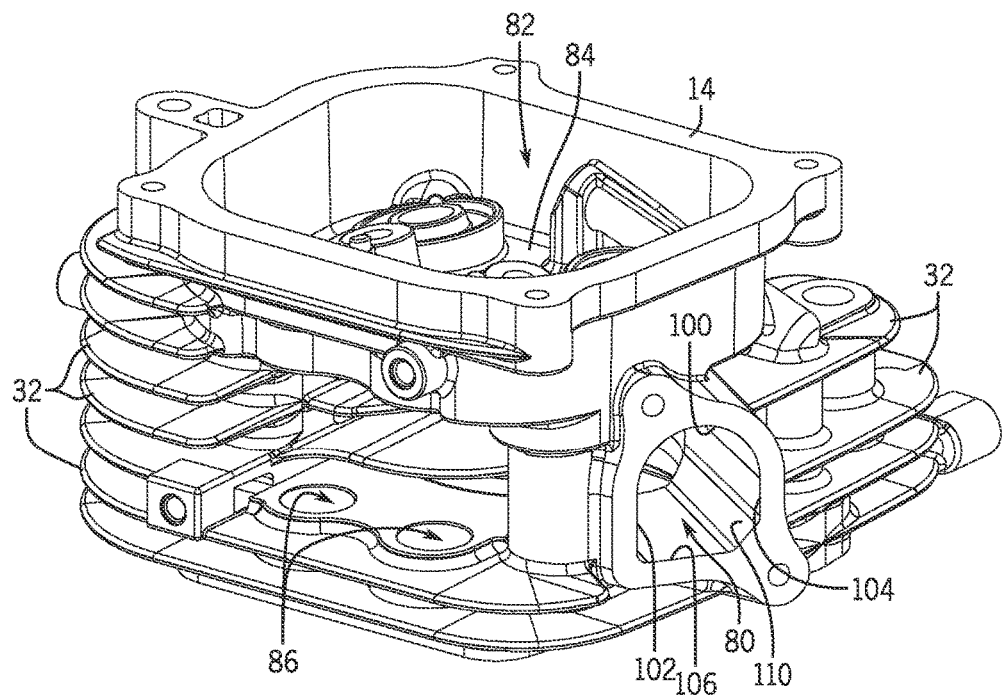
FIG. 3 is a side perspective view of the cylinder head of FIG. 2.
Figure 8:
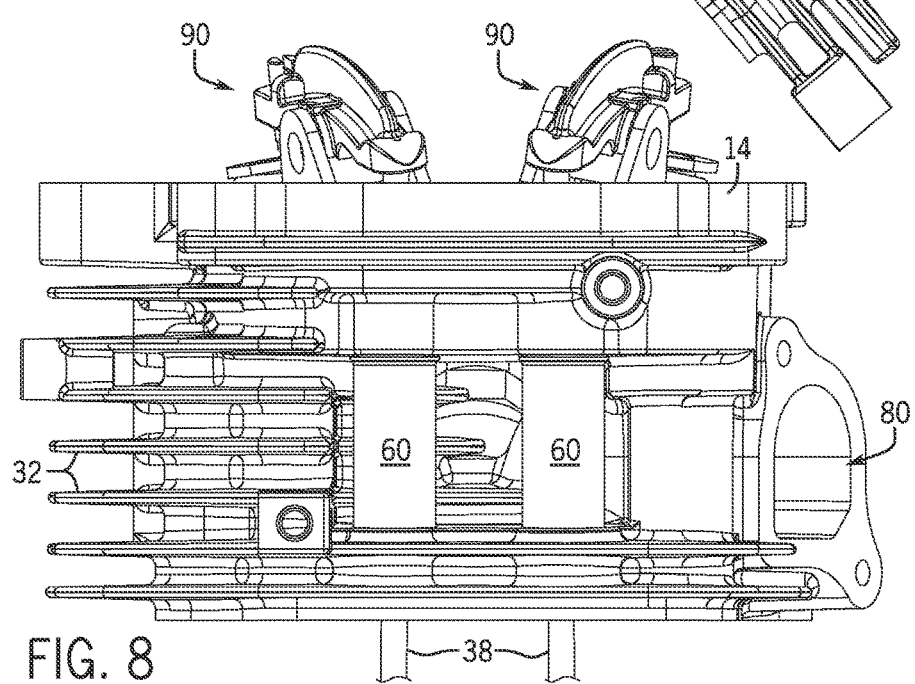
FIG. 8 is a side view of the cylinder head of FIG. 2 with rocker components assembled therein.

Referring next to FIG. 3, cylinder head 14 is shown with intake port 80 in the foreground. Cylinder head 14 has a recessed rocker cavity 82 having a lower surface 84 to accommodate at least a portion of the valve springs 44 and the rocker arm assembly 90, as best shown in FIG. 8. Cylinder head 14 is then capped with rocker covers 16, as shown in FIG. 1. Referring back to FIG. 3, lower push rod tube bores 86 are shown having a smaller diameter than the upper push rod bores 88 as shown in FIG. 2 to accommodate the efficient press fit of push rod tubes 60 therein. Accordingly, as one skilled in the art will now recognize, the push rod tubes are wholly contained within the cylinder head from the lower surface 84 of the rocker cavity 82 down through push rod tube bores 86 extending near the lower surface of cylinder head 14, as will be described with reference to FIG. 9.

Figure 4:
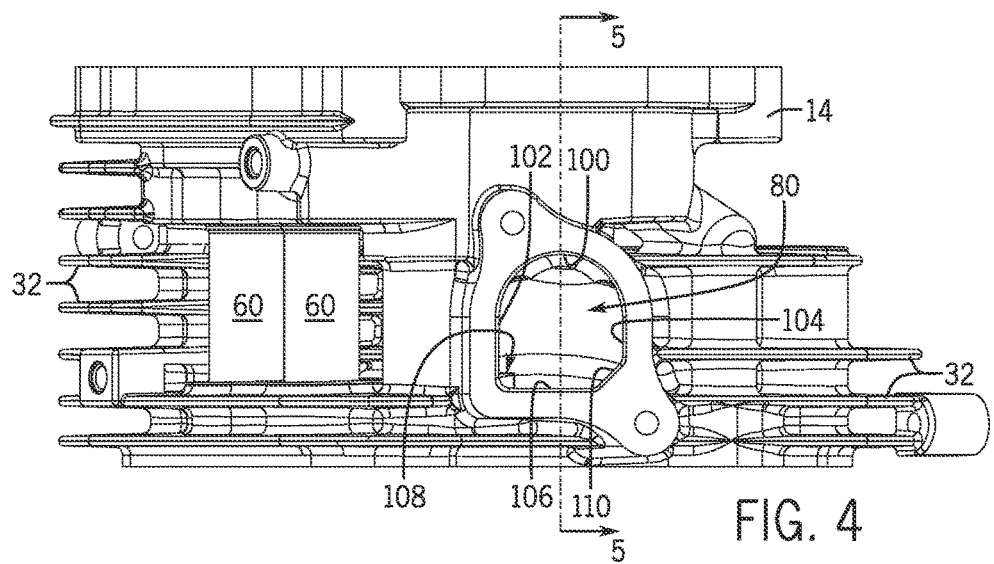
FIG. 4 is a side view of the cylinder head of FIG. 3.

Referring to both FIGS. 3 and 4, intake port 80 of cylinder head 14 is a modified D-shape that extends substantially evenly through cylinder head 14 toward the combustion chamber, other than the standard draft required for casting, which is typically and approximately 1°. The modified D-shape of intake port 80 comprises an arcuate surface 100 coupled to substantially flat side surfaces 102, 104 wherein flat side surface 102 extends a length greater than that of flat side surface 104. Flat side surface 106 is opposite arcuate surface 100 and is joined to flat side surface 102 by a generally right angle 108; however, it is understood that the inside corner of said right angle 108 may be formed by a gradual transition. Flat side surface 106 connects to flat side surface 104 via a flat, substantially planar, anti-puddling surface 110 in a general 45 degree angle, thereby cutting off, or eliminating, what would be the other 90 degree angle of a typical "D-shaped" configuration, thus forming the modified D-shaped configuration. The utility of the modified D-shaped configuration will be described with reference to FIG. 7.

Figure 5:
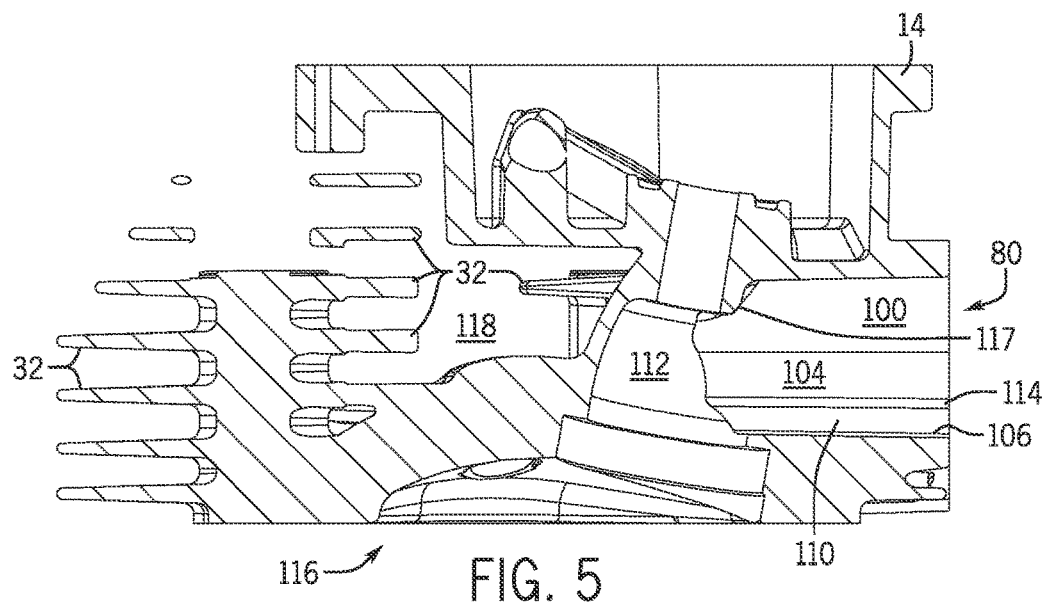
FIG. 5 is a cross-section view taken along line 5-5 of FIG. 4.

FIG. 5 is a cross-section taken along line 5-5 of FIG. 4 and shows intake port 80 of cylinder head 14 extending inward to intake valve passage 112. Intake port 80 is shown with the upper arcuate surface 100 connected to the flat side surface 104 connected to the anti-puddling surface 110 via a small transition surface 114. Intake valve passage 112 communicates with a combustion chamber 116. Intake port 80 extends substantially uniformly from an outer edge of cylinder head 14 to intersect with intake valve passage 112 and combustion chamber 116 at an inward transition region 117. The flat side surface 106 is substantially planar and its cross-section is perpendicular to a central axis of a cylinder bore and piston under the combustion chamber 116 or, in preferred embodiment, parallel to the bottom surface of the cylinder head. FIG. 5 also shows a cooling air pass-through 118 that provides additional cooling to cooling fins 32.

Figure 6:
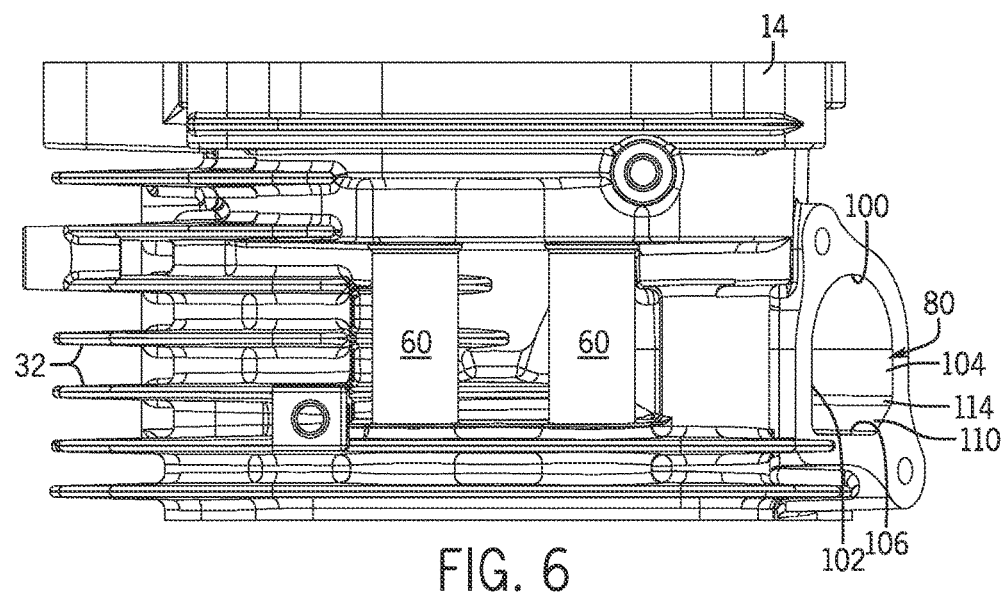
FIG. 6 is a side view of the cylinder head of FIG. 2.

Referring to FIG. 6, cylinder head 14 is shown in a side view having push rod tubes 60 inserted therein and shows another view of intake port 80 in perspective in which arcuate surface 100 connects to the substantially parallel flat side surfaces 102, 104, wherein flat side surface 104 connects to flat side surface 106 at a substantially right angle. The flat side surface 104 and the flat side surface 106 are connected by the flat, substantially planar, anti-puddling surface 110 via a transition surface 114.

Figure 7:
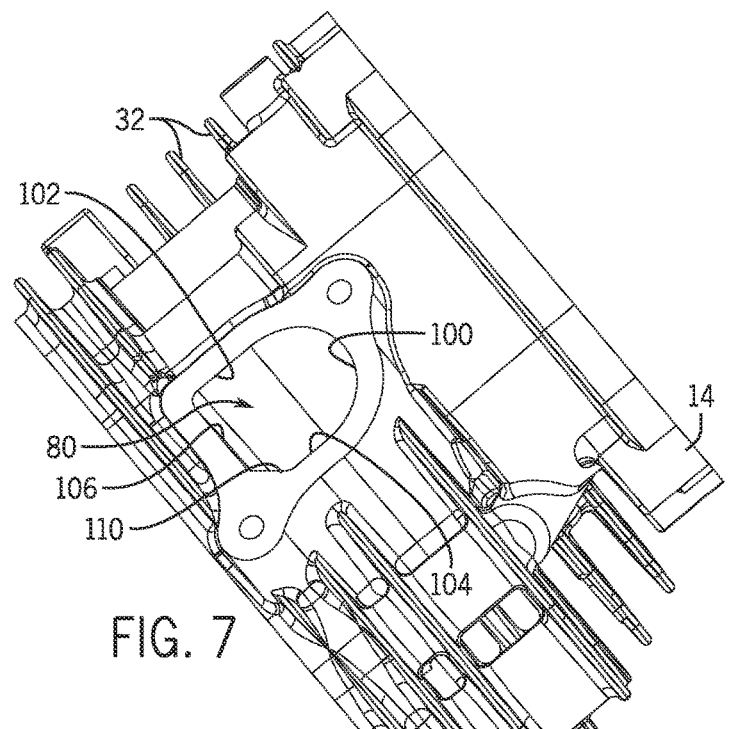
FIG. 7 is a side view of the cylinder head of FIG. 2 rotated in an exemplary orientation as implemented in the engine of FIG. 1.

FIG. 7 shows cylinder head 14 and intake port 80 orientated as installed on internal combustion engine 10 as shown in FIG. 1 in a horizontal crankshaft configuration such that the flat, substantially planar, anti-puddling surface 110 is substantially horizontal. In this configuration, the flat, anti-puddling surface 110 provides more surface area for unburned fuel to dissipate and prevent what is known in the industry as "puddling." As is known, "puddling" of fuel in a liquid form can cause a pop or backfiring on re-ignition. The anti-puddling surface 110, in the horizontal crankshaft orientation, reduces the occurrence of such puddling in a properly tuned engine. The aforementioned internal combustion engine 10 of FIG. 1 is also constructed to operate in a vertical crankshaft position wherein flat side surface 102 is substantially parallel with the horizon and thus becomes the anti-puddling surface. Surfaces 102, 110 are substantially planar across a longitudinal length of the intake port, are opposite one another in the intake port, and are oriented approximately 45 degrees with respect to each other. It is understood that while cross-sections of the anti-puddling surface is substantially horizontal, the surface does have a slope toward the combustion chamber.

Alternatively, one skilled in the art will now readily recognize that the other surfaces could be used in conjunction with one another to provide at least two anti-puddling surfaces in engine configuration orientations rotated in approximately 45 degree increments. Such configuration provides for a wide implementation of an engine incorporating the present invention. This increased surface area on the horizontal surface allows for the spreading out of fuel over a wider surface to promote higher evaporation rates, which in turn improves atomization to improve the combustion process, and results in reduced misfires and improves the consistency of the exhaust emissions. Additionally, the reduction and/or elimination of fuel puddling that is provided by the present invention also reduces any periodic over-rich combustion that typically results in black exhaust emission.

FIG. 8 shows cylinder head 14 assembled with rocker arm assemblies 90 mounted thereon and push rods 38 extending upward to the rocker arm assemblies 90 through push rod tubes 60. Intake port 80 is shown in a side perspective view. As previously mentioned, rocker covers 16 of FIG. 1 is attached over cylinder head 14 to enclose rocker arm assemblies 90.

Figure 9:
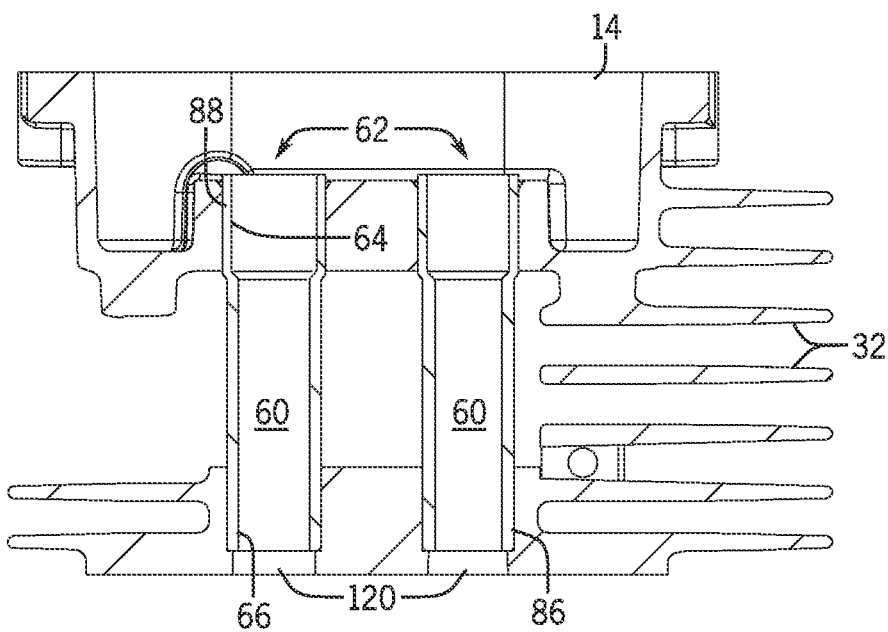
FIG. 9 is a sectional view of the cylinder head of FIG. 2 showing push rod tube holders in cross section.

Referring now to FIG. 9, cylinder head 14 is shown in cross section through push rod tubes 60. Push rod tubes 60 have a smaller diameter 66 on a lower end and a larger diameter 64 at an upper end. With the cylinder head 14 having a larger bore 88 at the upper end and a smaller bore 86 at the lower end to allow for push rod tubes 60 to be dropped into the passage bores 62 until resistance is met whereby the push rod tubes 60 are then pressed into place against boss stops 120. The boss stops provide affirmative seating of the push rod tubes 60 into cylinder head 14.

Figure 10:
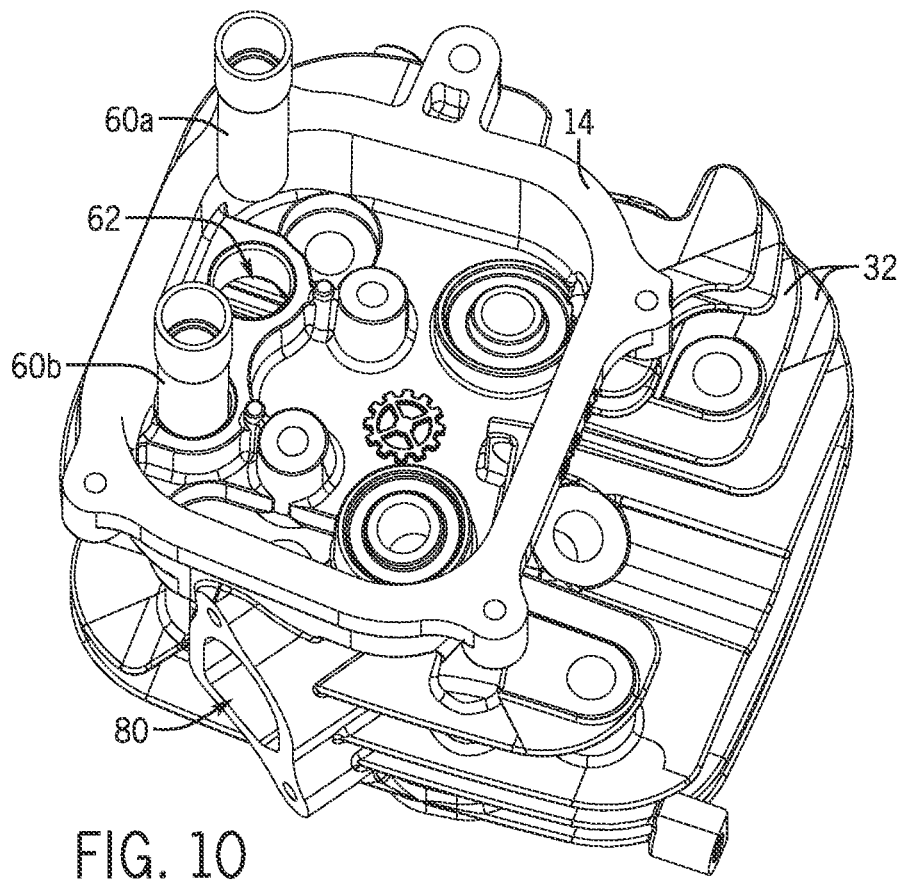
FIG. 10 is a top perspective view of the cylinder head of FIG. 2.

Referring to FIG. 10, cylinder head 14 is shown in perspective from a top side view with push rod tube 60(a) above push rod tube passage bores 62, and push rod tube 60(b) partially inserted into its respective passage to then be pressed firmly into place. The modified D-shaped intake port 80 is shown from the top side view perspective.

Figure 11:
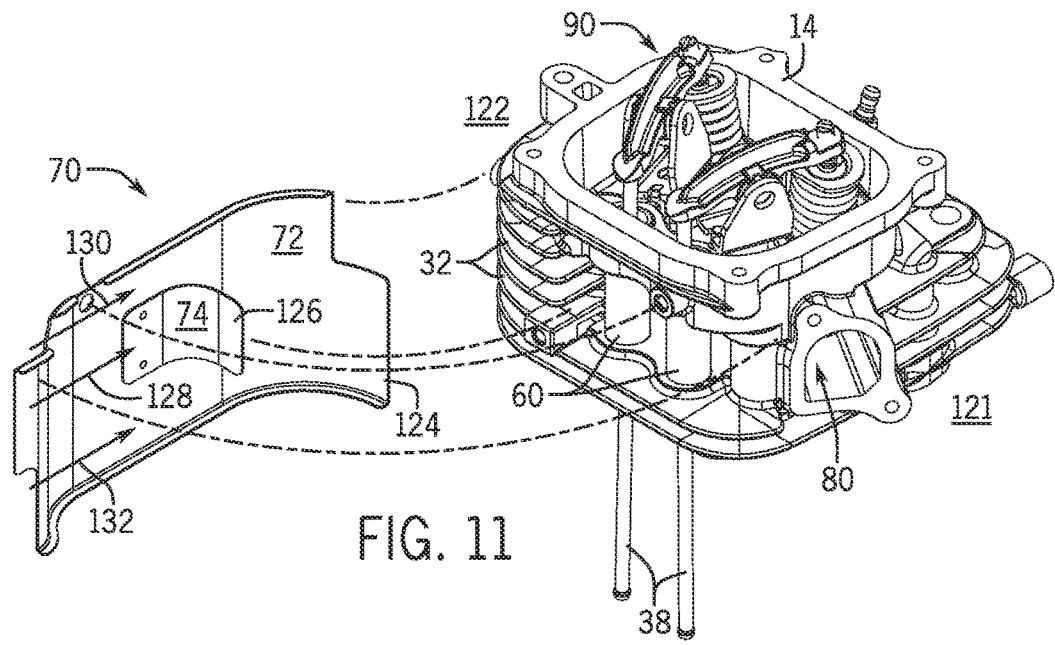
FIG. 11 is a perspective view showing an assembled cylinder head of FIG. 2 with an air guide rotated away therefrom.

FIG. 11 shows cylinder head 14 in an assembled configuration with rocker arm assemblies 90 installed therein and push rods 38 extending therefrom. Air diverter 70 is shown rotated away from cylinder head 14 where it is secured thereto. Air diverter 70 includes a main diverter shield 72 which extends from a cooling source at a front side 121 of the engine to a back side 122 of the engine. A cooling source 31, of FIG. 1, draws air inward through engine cover 20 and air diverter 70, directs some of that cooling air into and across at least two distinct areas of cylinder head 14. Main diverter shield 72 has a first arcuate member 124 to direct cooling air over and across cooling fins 32 at a back side 122 of cylinder head 14. The second arcuate member 126 directs air to and across push rod tubes 60 and cooling fins 32 behind the push rod tubes 60. The air flow is constructively divided into three paths, an internal air path shown by arrow 128 and directed by the secondary air guide/diverter 74 and second arcuate member 126, and rear air flow path 130,132 being directed by main diverter shield 72 and first arcuate member 124.

Figure 12:
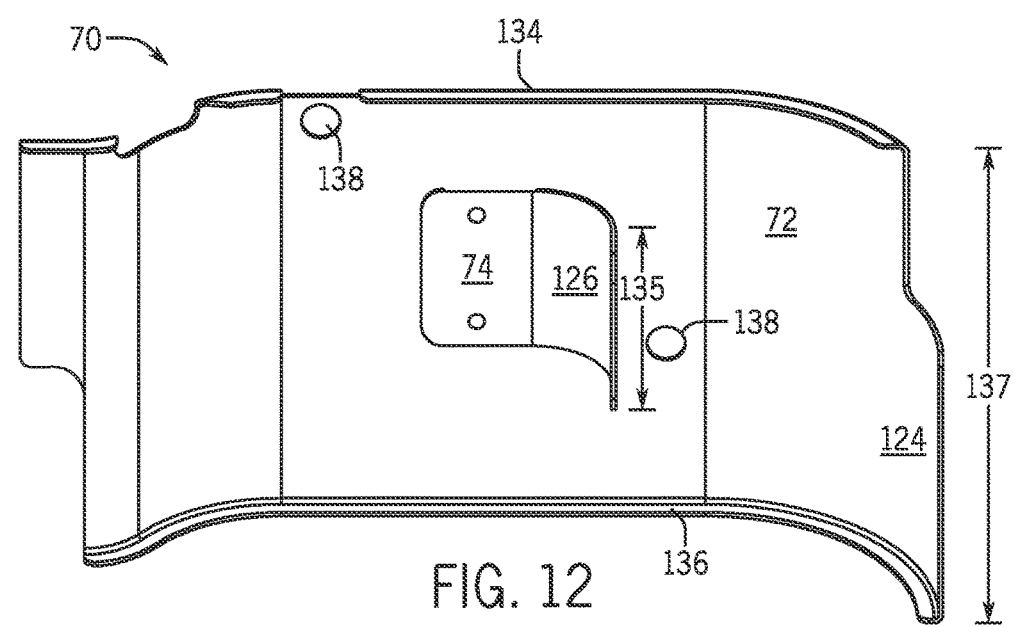
FIG. 12 is a side view of the air guide of FIG. 11.

Referring to FIG. 12, these air flow channels are formed by the second arcuate member 126 having a width 135 less than the width 137 of the first arcuate member 124. Air guide 70 is constructed with upper and lower lips 134, 136 to assist in retaining air flow within air guide 70. Openings 138 allow for fasteners to pass therethrough and fasten air guide 70 to cylinder head 14.

Figure 13:
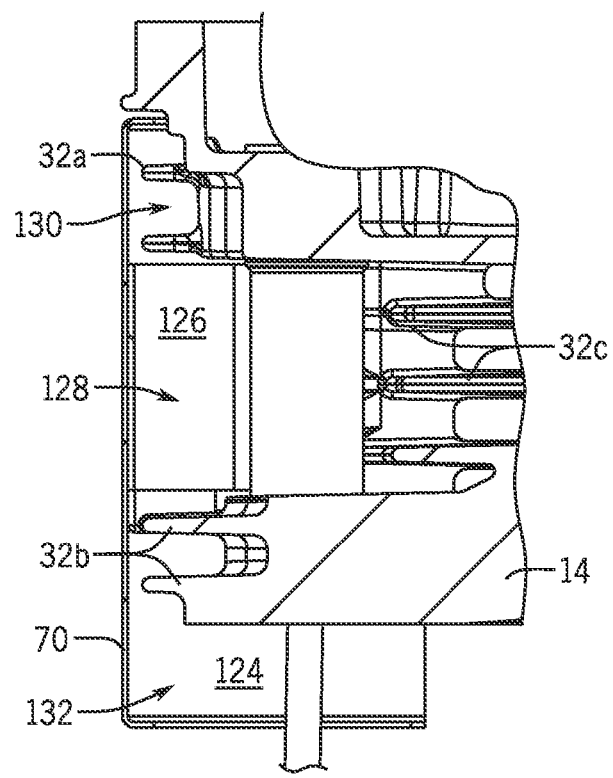
FIG. 13 is a partial sectional view of the cylinder head and air guide of FIG. 11.

FIG. 13 is a section view showing the multiple air path/channels 128, 130, 132. Air flow path 130 directs cooling air across cooling fins 32(a), while air flow path 132 directs air across cooling fins 32(b). The internal air flow path 128 directs air across cooling fins 32(c) located centrally and internally within cylinder head 14.

Figure 14:
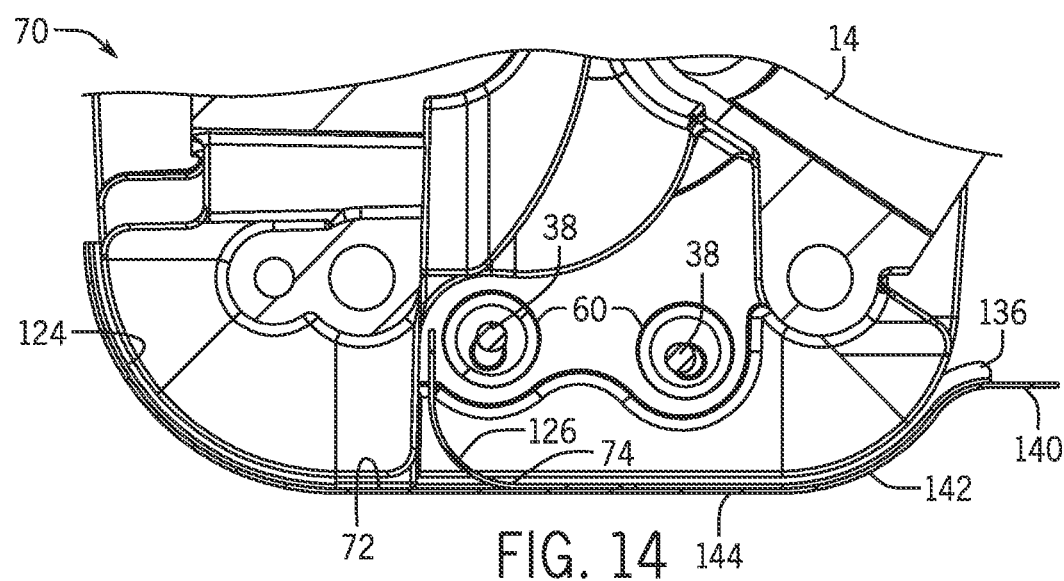
FIG. 14 is a partial top view of the cylinder head and air guide configuration of FIG. 11.

Referring to FIG. 14, is a top section view showing air diverter 70 from a top view installed on cylinder head 14. Air guide 70 includes a first planar section 140 extending frontward to receive air flow therein connected to transition section 142 leading to longitudinally planar section 144 and terminating at the first and second arcuate members 124, 126. FIG. 14 also shows push rod tubes 60 installed in cylinder head 14 with push rods 38 extending therethrough.

Figure 15:
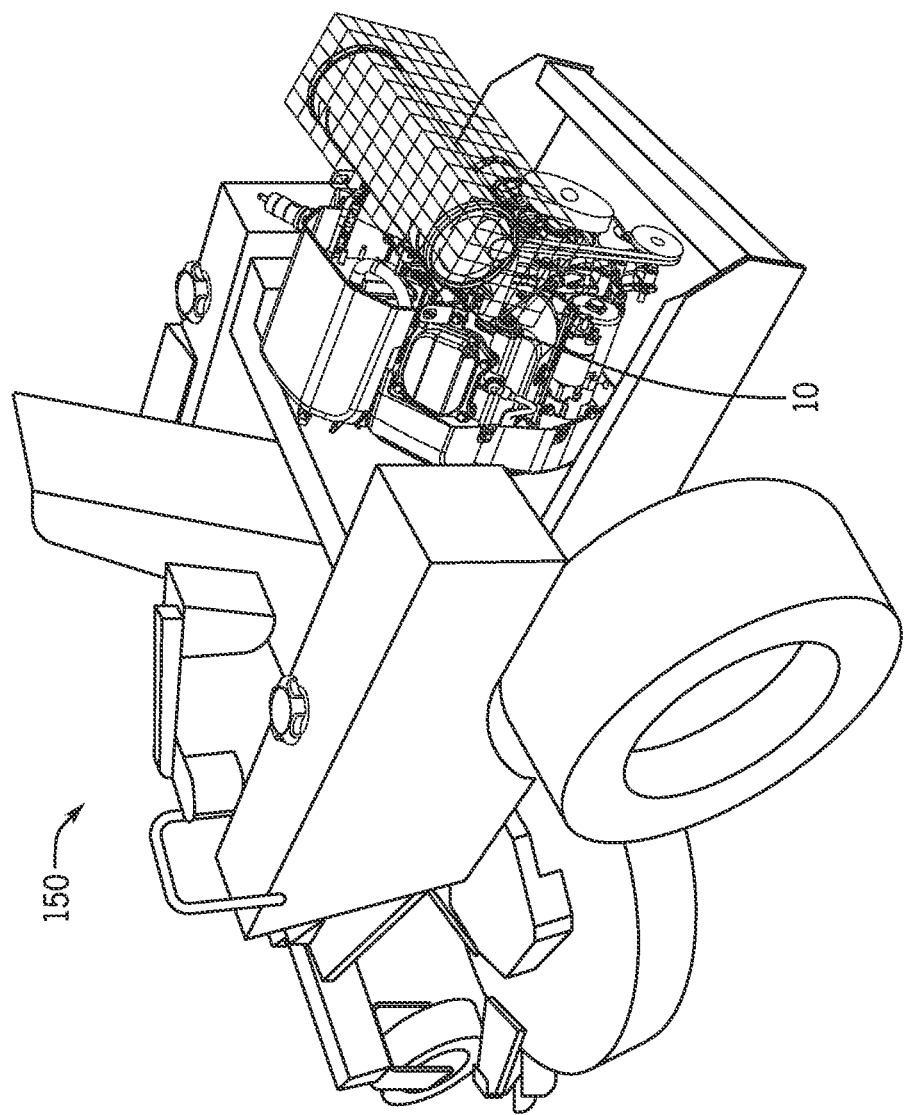
FIG. 15 is a perspective view of a wheel driven vehicle incorporating the present invention.

FIG. 15 shows an example of a wheel driven vehicle 150 powered by internal combustion engine 10 incorporating the present inventions. In this case, the wheel driven vehicle is a lawnmower, but could equally be any wheel driven vehicle.

Figure 16:
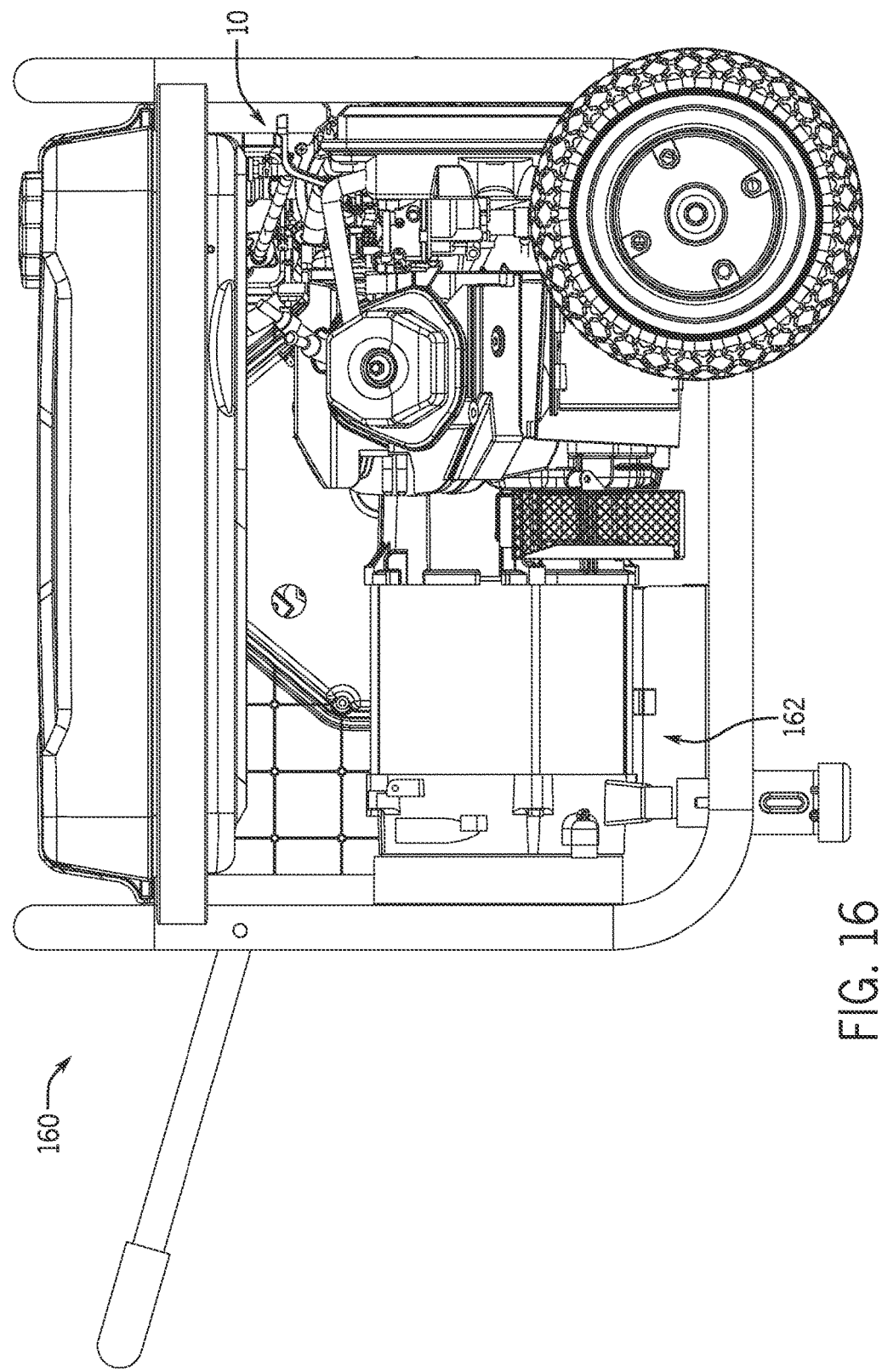
FIG. 16 is an exemplary non-wheel driven apparatus incorporating the present invention.

FIG. 16 shows a non-wheel driven apparatus 160, in this case a portable generator. The portable generator includes internal combustion engine 10 driving a generator unit 162 and is just one example of a non-wheel driven apparatus benefitting from the inventions described herein, but could equally be applicable to any non-wheel driven apparatus, including watercraft.

As one skilled in the art will now readily recognize, by eliminating push rod passages that are usually cast into the cylinder head, and minimizing the push rod tubes, a substantial amount of the casting can be eliminated resulting in new open areas that can be utilized for additional cooling. The new push rod tubes of the present invention allow for more cooling air to communicate with the combustion chamber and exhaust port.

There are two engine mounting surfaces associated with the engine of the present invention. FIG. 1 shows the engine is configured in the horizontal crankshaft position with the lower end being the mounting surface. When the engine is configured in the vertical crankshaft position, the engine of FIG. 1 is essentially tipped back making the back side of the engine the mounting surface. In this configuration, a different oil pan is used and the carburetor and associated linkage are modified but the engine configuration does not require any major modifications.

Therefore, according to one embodiment of the invention, a cylinder head for an internal combustion engine includes a housing having a recess defining a top portion of a combustion chamber. The cylinder head further includes an intake port defined by a first channel extending from the top portion of the combustion chamber to an outer end of the housing, and an exhaust port defined by a second channel extending from the top portion of the combustion chamber to an outer end of the housing. An intake valve is positioned to control communication of the intake port with the combustion chamber, and an exhaust valve is positioned to control communication of the exhaust port with the combustion chamber. The intake port further includes a cross-section having a modified D-shape with a single 90 degree corner. The modified D-shape cross-section extends substantially a length of the intake port.

In accordance with another aspect of the invention, an internal combustion engine is configured to operate in a horizontal and a vertical crankshaft configuration. The engine includes a cylinder block having at least one cavity defining a combustion chamber, a crankshaft rotatably mounted to cylinder block, and at least one piston moveably inserted in the cylinder block cavity. At least one cylinder head is mounted to the cylinder block to enclose the combustion chamber. The cylinder head includes an intake port defined by a first passage in communication with the combustion chamber, the intake port having first and second flat planar surfaces and an exhaust port defined by a second passage in communication with the combustion chamber. An intake valve is positioned to control communication of the intake port with the combustion chamber and an exhaust valve is positioned to control communication of the exhaust port with the combustion chamber. The first flat surface of the intake port is substantially horizontal when the engine is positioned in a first orientation where the crankshaft is substantially horizontally oriented, while the second flat surface of the intake port is substantially horizontal when the engine is positioned in a second orientation, different from the first orientation, and where the crankshaft is substantially vertically oriented.

According to yet another embodiment of the invention, an engine operable in a first orientation and a second orientation includes a cylinder block coupled to a crankcase and a cylinder head coupled to the cylinder block. The cylinder head includes an intake port and an exhaust port. The intake port having a first substantially flat surface and a second substantially flat surface. The intake port further includes a cross-section having an arch surface coupled at each end by a pair of substantially parallel planar surfaces. A first substantially parallel planar surface has a length longer than a second substantially parallel planar surface. The second substantially parallel planar surface is coupled at an end opposite the arch surface to a chamfer surface at approximately a 45 degree angle. An opposite side of the chamfered surface is connected to the first substantially parallel planar surface by a planar longitudinal surface that is opposite the arch surface.

According to yet another embodiment of the invention, an engine includes a cylinder coupled to a crankcase and a cylinder head coupled to the cylinder. The cylinder has a central axis. The cylinder head includes an intake port and an exhaust port. The intake port includes a first planar surface that is relatively horizontal with respect to a horizon, and a second surface adjacent to the first planar surface. The second surface has a cross section perpendicular to the central axis. The intake port further includes a third planar surface adjacent the second surface and opposite the first planar surface.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cylinder head for an internal combustion engine comprising:
   a housing having a recess defining a top portion of a combustion chamber;
   an intake port defined by a first channel extending from the top portion of the combustion chamber to an outer end of the housing;
   an exhaust port defined by a second channel extending from the top portion of the combustion chamber to an outer end of the housing;
   an intake valve positioned to control communication of the intake port with the combustion chamber; and
   an exhaust valve positioned to control communication of the exhaust port with the combustion chamber; and
   wherein the intake port has a cross-section comprising a modified D-shape comprising a single 90 degree corner, the modified D-shape cross-section extending substantially a length of the intake port.

2. The cylinder head of claim 1 wherein the intake port comprises first and second flat surfaces joined to create the 90 degree corner.

3. The cylinder head of claim 2 wherein the intake port comprises an anti-puddling surface joined to the second flat surface to create a chamfered corner thereby providing the modified D-shaped cross-section by eliminating a second 90 degree corner.

4. The cylinder head of claim 3 wherein the second flat surface is substantially perpendicular to a central axis of the combustion chamber.

5. The cylinder head of claim 4 wherein the anti-puddling surface is offset 45 degrees from the second flat surface.

6. The cylinder head of claim 3 wherein an edge of the modified D-shaped cross-section defined by the second flat surface is substantially perpendicular to a central axis of the combustion chamber.

7. The cylinder head of claim 1 wherein the intake port has an inlet and an inward transition region, the inward transition region comprising a protrusion in the intake port to direct the intake port to the combustion chamber; wherein the modified D-shaped cross-section extends from the intake port inlet to the inward transition region.

8. The cylinder head of claim 1 incorporated into one of a wheel driven vehicle and a non-wheel driven apparatus.

9. An engine operable in a horizontal and a vertical crankshaft configuration, the engine comprising:
a cylinder block having at least one cavity defining a combustion chamber;
a crankshaft rotatably mounted to cylinder block;
at least one piston moveably inserted in the cylinder block cavity;
at least one cylinder head mounted to the cylinder block and enclosing the combustion chamber, the cylinder head comprising:
an intake port defined by a first passage in communication with the combustion chamber, the intake port having first and second flat surfaces;
an exhaust port defined by a second passage in communication with the combustion chamber;
an intake valve positioned to control communication of the intake port with the combustion chamber;
an exhaust valve positioned to control communication of the exhaust port with the combustion chamber; and
wherein the first flat surface of the intake port has a cross-section that is substantially horizontal when the engine is positioned in a first orientation where the crankshaft is substantially horizontally oriented; and
wherein the second flat surface of the intake port has a cross-section that is substantially horizontal when the engine is positioned in a second orientation, different from the first orientation, and where the crankshaft is substantially vertically oriented; and wherein the intake port further comprises an intermediate flat surface between the first and second flat surfaces.

10. The engine of claim 9 wherein the first flat surface forms an anti-puddling surface when the engine is positioned in the first orientation; and
wherein the second flat surface forms an anti-puddling surface when the engine is positioned in the second orientation.

11. The engine of claim 10 wherein
the intake port further comprises a modified D-shaped cross-section comprising only one 90 degree corner, the cross-section extending a length of the intake port; and
wherein the intermediate flat surface and the second flat surface are joined to create the 90 degree corner.

12. The engine of claim 11 wherein the first flat surface is joined to the intermediate flat surface to create a chamfered corner of the modified D-shaped cross-section spaced from the 90 degree corner by a flat surface.

13. The engine of claim 12 wherein the first flat surface is offset approximately 45 degrees from the intermediate flat surface.

14. The engine of claim 11 wherein the intermediate flat surface is substantially perpendicular to a central axis of the combustion chamber.

15. The engine of claim 11 wherein an edge of the modified D-shaped cross-section defined by the intermediate flat surface is substantially perpendicular to a central axis of the combustion chamber.

16. The engine of claim 12 wherein the intake port has an inlet and a transition region, the transition region constructed to direct the intake port to the combustion chamber; wherein the modified D-shaped cross-section extends from the intake port inlet to the transition region.

17. The engine of claim 12 wherein the first and second flat surfaces are substantially planar across a longitudinal length of the intake port and are opposite one another in the intake port.

18. The engine of claim 9 incorporated into one of a wheel driven vehicle and a non-wheel driven apparatus.

19. An engine operable in a first orientation and a second orientation, the engine comprising:
a cylinder block coupled to a crankcase;
a cylinder head coupled to the cylinder block, the cylinder head comprising:
an intake port and an exhaust port, the intake port comprising:
a first substantially flat surface and second substantially flat surface;
a cross-section having an arch surface coupled at each end by a pair of substantially parallel planar surfaces, a first substantially parallel planar surface having a length longer than a second substantially parallel planar surface, the second substantially parallel planar surface coupled at an end opposite the arch surface to a chamfer surface, wherein an opposite side of the chamfered surface is connected to the first substantially parallel planar surface by a planar longitudinal surface that is opposite the arch surface;
wherein the first substantially flat surface forms an anti-puddling surface when the engine is in the first orientation; and
wherein the second substantially flat surface forms an anti-puddling surface when the engine is in the second orientation.

20. The engine of claim 19 wherein a cross-section of the first substantially flat surface is substantially parallel to a first mounting surface and relatively horizontal when the engine is operated in the first orientation, and a cross-section of the second substantially flat surface is substantially parallel to a second mounting surface and relatively horizontal when the engine is operated in the second orientation.

21. The engine of claim 19 wherein the first orientation is approximately 90 degrees rotated from the second orientation.

22. The engine of claim 19 wherein the intake port has an inlet and an intake valve passage, the shape of the cross-section of the intake port extending from the inlet to the intake valve passage.

23. An engine comprising:
a cylinder coupled to a crankcase, the cylinder having a central axis;
a cylinder head coupled to the cylinder, the cylinder head comprising:
an intake port and an exhaust port, the intake port comprising:
a first planar surface that is relatively horizontal with respect to a horizon;
a second surface adjacent to the first planar surface, the second surface being substantially perpendicular to the central axis;
a third planar surface adjacent the second surface and opposite the first planar surface; and an arch surface opposite the second surface and coupled to one of the first planar surface and third planar surface.

24. The engine of claim 23 further comprising:
a second cylinder coupled to the crankcase in a v-twin arrangement with respect to the other cylinder, the second cylinder having a central axis;
a second cylinder head coupled to the second cylinder, the second cylinder head comprising:
  an intake port and an exhaust port, the intake port comprising:
    a first planar surface that is relatively horizontal with respect to a horizon;
    a second surface adjacent to the first planar surface, the second surface having a cross section perpendicular to the central axis;
    a third planar surface adjacent the second surface and opposite the first planar surface.

25. The engine of claim 23 wherein the third planar surface is at a 90 degree angle to the second surface.

26. The engine of claim 23 wherein the second surface is offset 45 degrees from the first planar surface.

27. The engine of claim 23 wherein the second surface adjacent to the first planar surface is substantially planar.

28. The engine of claim 9 further comprising at least two engine mounting surfaces, a first mounting surface when the engine is configured in the horizontal crankshaft position with a lower end of the engine being the first mounting surface, and a second mounting surface when the engine is configured in a vertical crankshaft position with a rear of the engine being the mounting surface.

29. The engine of claim 28 wherein a cross-section of the first flat surface of the intake port is substantially parallel to the first mounting surface and a cross-section of the second flat surface of the intake port is substantially parallel to the second mounting surface.

* * * * *